United States Patent [19]
Wilbourn

[11] Patent Number: 5,762,324
[45] Date of Patent: Jun. 9, 1998

[54] ELASTOMERIC MOUNTING

[75] Inventor: Robert Cecil Wilbourn, Leicester, United Kingdom

[73] Assignee: Dunlop Limited, London, United Kingdom

[21] Appl. No.: 656,251

[22] PCT Filed: Dec. 7, 1994

[86] PCT No.: PCT/GB94/02679

§ 371 Date: Aug. 13, 1996

§ 102(e) Date: Aug. 13, 1996

[87] PCT Pub. No.: WO95/16150

PCT Pub. Date: Jun. 15, 1995

[30] Foreign Application Priority Data

Dec. 8, 1993 [GB] United Kingdom ............... 9325147

[51] Int. Cl.⁶ ............................................. B60G 11/22
[52] U.S. Cl. ................................... 267/293; 267/292
[58] Field of Search ........................ 267/292, 293, 267/141.1, 140.13, 140.4, 235, 294, 220; 277/235; 403/228

[56] References Cited

U.S. PATENT DOCUMENTS

| | | |
|---|---|---|
| 3,351,308 | 11/1967 | Hirst . |
| 3,951,477 | 4/1976 | Townshend . |
| 4,214,738 | 7/1980 | Casper . |
| 4,995,598 | 2/1991 | Ingham .................... 267/293 |
| 5,131,638 | 7/1992 | Hein ......................... 267/293 |
| 5,242,146 | 9/1993 | Tecco ....................... 267/293 |
| 5,580,028 | 12/1996 | Tomczak ................... 267/293 |

FOREIGN PATENT DOCUMENTS

| | | |
|---|---|---|
| 0421569 | 4/1991 | European Pat. Off. . |
| 2803743 | 11/1978 | Germany . |
| 751612 | 7/1956 | United Kingdom . |
| 2251050 | 6/1992 | United Kingdom . |

OTHER PUBLICATIONS

PCT International Search Report, Apr. 10, 1995.
*Patent Abstract of Japan*, vol. 9, No. 132 (M–385).

Primary Examiner—Robert J. Oberleitner
Assistant Examiner—C. T. Bartz
Attorney, Agent, or Firm—Watson Cole Stevens Davis, P.L.L.C.

[57] ABSTRACT

An elastomeric mounting comprising a pair of rigid members (2, 3), an annular element (4) of elastomeric material sandwiched between confronting surfaces (6,7) of said members and a pillar (5) which extends centrally through the annular elastomeric element (4) into association with each of said rigid members, said pillar (5) being non-rigidly associated with at least one (2) of the rigid members whereby it is operative to prevent unlimited free separation of the rigid members (2,3) but allows the rigid members to move one towards the other to compress the elastomeric element (4) therebetween when the mounting is subject to applied compression load.

19 Claims, 6 Drawing Sheets

ELASTOMERIC MOUNTING

The invention relates to an elastomeric mounting of a type which is failsafe. Failsafe means in this specification that even in the event of failure of elastomeric material which forms part of the elastomeric mounting, the mounting is still operative to prevent free and unrestricted separation of two points interconnected by the mounting.

An example of a failsafe type elastomeric mounting is described in DE-A-2803743.

The present invention relates to a failsafe type mounting and also, but not exclusively, to an elastomeric mounting manufacturable at low cost.

In one of its aspects the invention provides an elastomeric mounting comprising a pair of rigid members, an annular element of elastomeric material sandwiched between confronting surfaces of said members and a pillar member which extends substantially centrally through the annular element of elastomeric material into association with each of said rigid members, said pillar being secured rigidly relative to one of the rigid members and extending through an opening in the other rigid member with an all-round clearance between the pillar and the opening, and that end of the pillar extending through the apertured rigid member incorporating stop means engageable with the apertured rigid member to prevent unlimited free separation of the rigid members but allow the rigid members to move one towards the other to compress the elastomeric element therebetween when the mounting is subject to applied compression load, said apertured rigid member being provided with a recess in the region of the aperture at a side of that member which faces away from the elastomeric element, and said stop means being positioned in said recess.

The elastomeric element may be bonded to one or both of the rigid members, but the invention teaches that this is not an essential feature and that preferably the elastomeric material is not bonded to either of the rigid members.

The elastomeric element preferably lies spaced radially from the pillar. More preferably the elastomeric element is substantially free at least in part to deform in radially inwards and radially outwards directions.

The pillar has an axial length selected preferably to maintain the elastomeric element in compression between the rigid members even in the absence of applied compression load. More preferably the mounting is constructed such that the elastomeric element is maintained in compression even in the event of being subject to any load, such as a re-bound load, which tends to move said confronting surfaces axially away from one another.

Pillar adjustment means may be provided to enable adjustment of that maximum separation of the rigid members allowed by the pillar and in consequence allow adjustment of the residual compression load on the elastomeric element.

The pillar may be secured rigidly relative to one of the rigid members. It may be cast integrally as a part of a rigid member or, especially if the rigid member is not cast, it may be secured for example by swaging or welding.

The rigid members preferably have non-planar confronting surfaces at least over parts of their respective surfaces which lie in contact with the elastomeric element.

The non-planar confronting surfaces may be defined by cast rigid members or, to minimise costs, may be of pressed metal.

The non-planar confronting surfaces preferably are oriented such that in the event of relative transverse movement of the rigid members (relative movement in a direction parallel with a plane containing the annular elastomeric element) the elastomeric element is loaded in compression as well as shear and/or being subject to rolling.

Considered axially, in the longitudinal direction of the pillar, in the absence of applied load, the region at which one rigid member contacts the elastomeric element may lie wholly spaced axially from the region at which the other rigid member contacts the elastomeric element. As an alternative a part of the region at which one rigid member contacts the elastomeric element may be axially aligned with or overlap a part of the region at which the other rigid member contacts the elastomeric element.

At least one of the confronting surfaces of the rigid members may be of a curved shape as considered in a plane which contains the major axis of the mounting (e.g. the longitudinal axis of the pillar). The annular elastomeric element may be curved, e.g. of circular shape, in cross section, and said shape may be substantially complementary with a curved shape of a surface region of one of the rigid members. The elastomeric element may be of toroidal shape.

It is envisaged that typically the annular elastomeric element will be of a constant transverse cross-sectional shape and dimension (i.e. in the cross-section of e.g. FIGS. 2, 3, 4 and 6 described hereinafter) at all positions around the annular element.

In the case of an annular element of a circular shape in transverse cross-section, each of the two parts of the circumference of the cross-section which lie in contact with a respective one of the two confronting surfaces preferably subtends an angle of less than 140°, more preferably less than 90°, about the centre of that circular cross-sectional shape when the mounting is not subject to applied compressive loading.

Similarly, in the case of an annular element of a non-circular cross-sectional shape, as considered about the centre of area of that cross-sectional shape the peripheral contact regions preferably subtend an angle of less than 140°, more preferably less than 90°.

The invention teaches that at least one of the confronting surfaces is of a non-planar shape which provides a recess region that serves as a flex zone into which the annular element can deform, there thereby being achieved a greater degree of axial deformation capability. Preferably, as considered in the axial direction of the mounting, at least one of the confronting surfaces is non-planar and shaped to define a recess region which lies axially beyond the part of that surface which is in contact with the annular element when the mounting is unloaded, and into which region the annular elastomeric element can deform axially when subject to applied compressive loading.

Preferably the pillar is secured rigidly relative to one of the rigid members and extends through an opening in the other rigid member with an all-round clearance between the pillar and opening. The clearance is dimensioned so that normally under a load applied in any transverse direction the shear and compression arising in the elastomeric element inhibits direct contact between the pillar and said apertured rigid member.

The end of the pillar extending through the apertured rigid member preferably incorporates stop means which, in the absence of applied compression load on the mounting, engages the apertured rigid member to prevent that apertured member moving freely without limitation away from the other rigid member.

The stop means may be a flange which extends radially outwardly from a main body of the pillar.

The stop means or a confronting surface of the apertured rigid member may be provided with a resilient element that acts as a buffer. The buffer cushions contact between the stop means and apertured rigid member as the mounting expands from a condition of applied compressive loading to a condition in which the rigid members are at maximum axial spacing.

The apertured rigid member may have a recess in the region of the aperture at a side of that member which faces away from the elastomeric element. The stop means may be positioned in that recess, preferably wholly at all states of compression of the mounting.

The pillar may be solid or hollow. It may be used to accommodate a retainer device such as a bolt for securing one part of the elastomeric mounting to one of two points to be interconnected by the mounting.

The elastomeric element may have location formations, which may be e.g. grooves or notches for preventing or restraining relative rotation of the two rigid members about the major axis of the mounting by cooperating with complimentary formations at confronting surfaces of the rigid members.

To restrain relative rotation the elastomeric element may have four notches or grooves, two at diametrically opposite regions of a part which contacts one rigid member and the other two at diametrically opposite regions of a part of the elastomeric element which contacts the other rigid member. One pair preferably is oriented at 90° to the other.

Assembly of the mounting may involve securing an end of the pillar to one of the rigid members (e.g. by swaging) after forming a sandwich of the two rigid members and the intervening annular elastomeric element. If the pillar is pre-secured to one of the rigid members assembly of the mounting may involve use of an interlock arrangement in which the free end of the pillar can extend through an aperture in the other rigid member only when the two rigid members are at a first (range of) relative angular positions as considered about the major axis of the mounting. Having inserted the pillar end (and its stop means) through said other rigid member and with the rigid members held urged towards one another the two rigid members are then rotated relative to one another about the major axis to lie at a second (range of) relative angular position at which the end of the pillar interlocks with the material defining the aperture of said other rigid member. Release of applied force or other means by which the two rigid members were held urged towards one another results in the stop means then acting to restrain free, unlimited separation of the rigid members. A lubricant may be used to assist sliding of one or each rigid member over the elastomeric element during relative angular rotation of the rigid members. Preferably means is provided to restrain subsequent relative angular movement of the rigid members so that the pillar end continues to provide an interlock. The restraint may arise from the location of the mounting to positions interconnected by the mounting or by use of e.g. location formations as described above.

An interlock may be achieved without the need for relative angular movement of the rigid members by providing an auxiliary retainer such as a circlip to sit between the stop means and said other rigid member and hold the stop means from passing back through the aperture.

Embodiments of the present invention will now be described, by way of example, with reference to the Drawings wherein.

Figure 1:
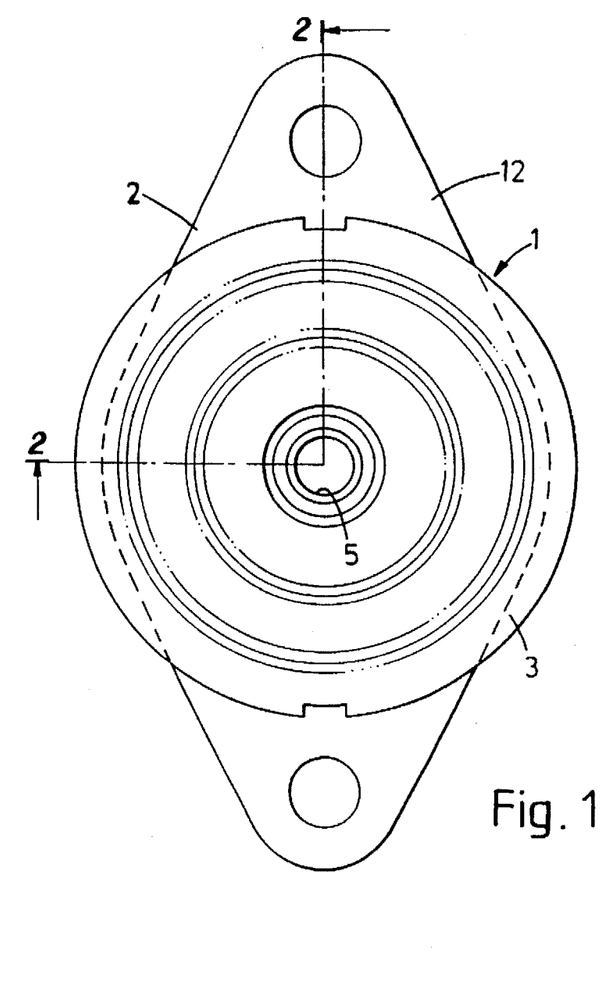
FIG. 1 shows in plan a mounting of the invention.
Figure 2:
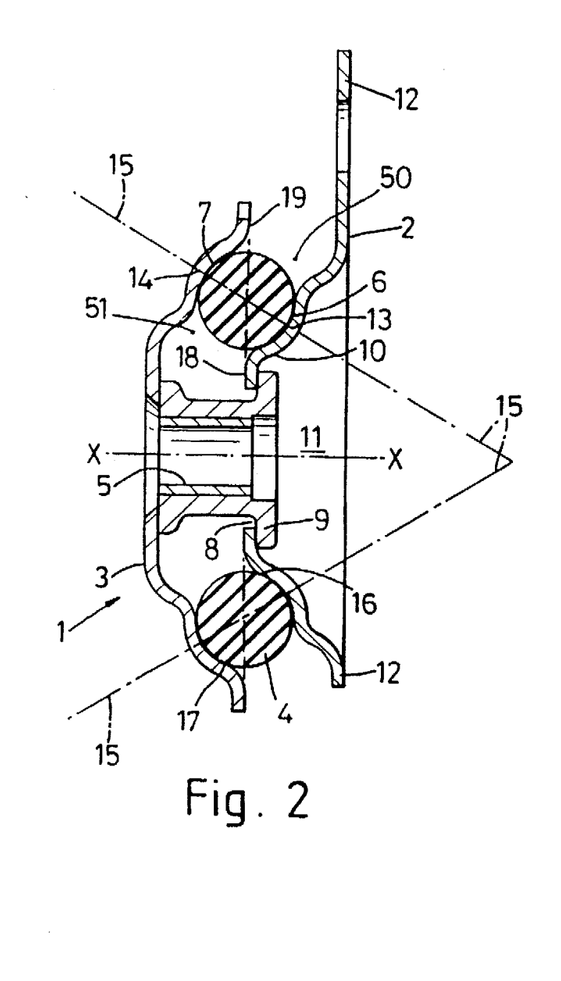
FIG. 2 is a section on the planes A—A of FIG. 1.

An unbonded type elastomeric mounting 1 suitable for resiliently mounting machinery, such as a portable electric generator, comprises a lower rigid plate 2, an upper rigid plate 3 and a toroidal rubber ring 4 between the plates. A pillar 5 is attached rigidly to the upper plate 3 and extends centrally through the rubber ring into association with the lower plate in a manner that causes it to prevent unlimited separation of the plates.

Each plate 2,3 is of sheet steel pressed to a non-planar profile that has an annular seat 6,7 curved in cross section as shown in FIG. 2. The seat has a curvature which corresponds substantially with the cross-sectional curvature of the ring 4.

Lower plate 2 has a central aperture 8 and the pillar 5 extends from the upper plate 3 through that aperture. The lower end of the pillar has a flange 9 extending radially outwardly so that the lower plate 2 is held captive relative to the upper plate 3.

The lower plate 2 has a surface 10 that faces away from the ring 4 and defines a recess 11 adjacent the aperture 8. The recess depth in the major axis direction X—X of FIG. 2 is sufficient to ensure that even under maximum applied compression load on the ring the flanged end 9 of the pillar remains in the recess. This allows the mounting to be secured with the planar boundary region 12 of the lower plate 2 in contact with a flat support surface (e.g. of a floor or machine) without risk of the pillar striking that surface.

The two annular seats 6,7 have adjacent thereto recess regions 50,51 which lie respectively beyond the seats 6,7 as considered in the axial direction X—X and serve as flex zones into which parts of the ring 4 can deform in response to applied compressive loading.

Seat 7 of upper plate 3 lies at a greater radius from major axis X—X than seat 6 of the lower plate 2. As viewed in FIG. 2 the centre 13 of the width of seat 6 therefore lies radially displaced from the centre 14 of the width of the seat 7. Thus the effective line of action 15 of force exerted by the plates on the ring 4 is inclined to the major axis X—X, in this case at approximately 45° in the absence of applied compression load.

In this embodiment the area of contact of the ring 4 with each seat 6,7 subtends an angle of 70° as considered in transverse cross-section as viewed in FIG. 2.

The pillar 5 is hollow to allow the upper plate 3 to be bolted conveniently to a machine.

The elastomeric mounting is assembled by positioning the plates and ring as shown in FIG. 2, introducing pillar 5 upwards through aperture 8 and with the rubber ring 4 held in compression between the plates the pillar is welded or swaged to the upper plate 3.

The length of the pillar 5 is chosen to ensure that the ring is always under compression in the X—X direction.

The spacing and shape of the plates is selected so that the boundaries 16,17 of the ring seats 6,7 of the plates 2,3 are at substantially the same axial position in the direction X—X. That is, boundary faces 18,19 of plates 2,3 are substantially axially aligned in the direction X—X.

When the mounting 1 is under applied compression, relative transverse movement of the plates 2,3 is resisted by shear and compression forces in the rubber ring.

Figure 3:
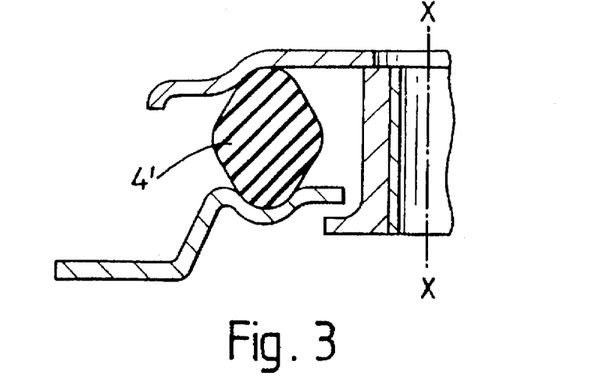
FIGS. 3 and 4 show in cross section alternative profiles of the elastomeric ring of FIG. 2.
Figure 4:
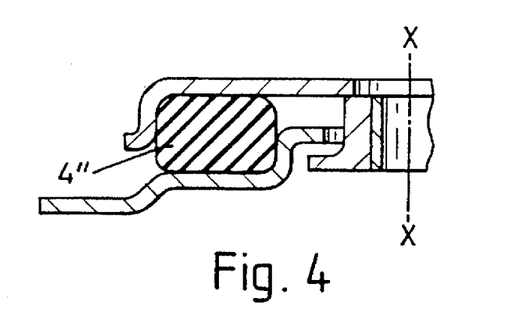
Figure 5:
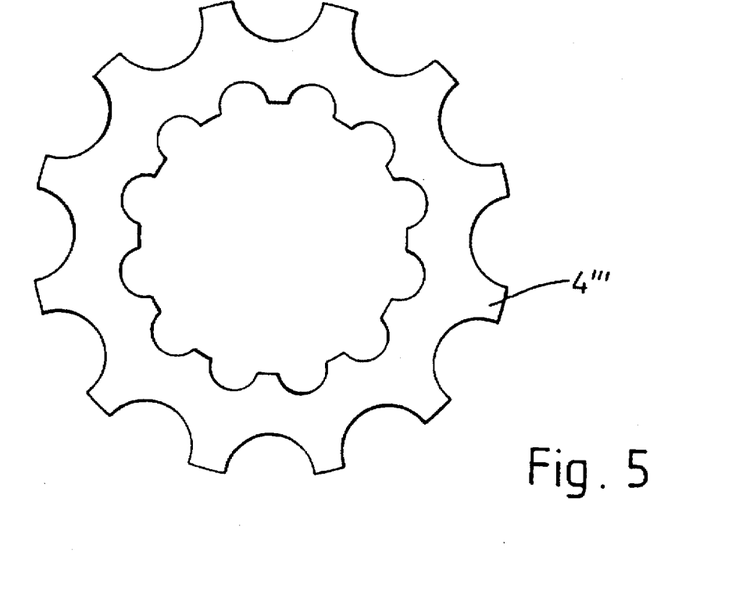
FIG. 5 is a plan view of another elastomeric ring.

FIGS. 3 and 4 show alternative cross-section profiles for the ring 4 of FIG. 2. The ring need not have a uniform cross section at all circumferential positions. Inner and outer regions may be recessed as shown in FIG. 5.

Figure 6:
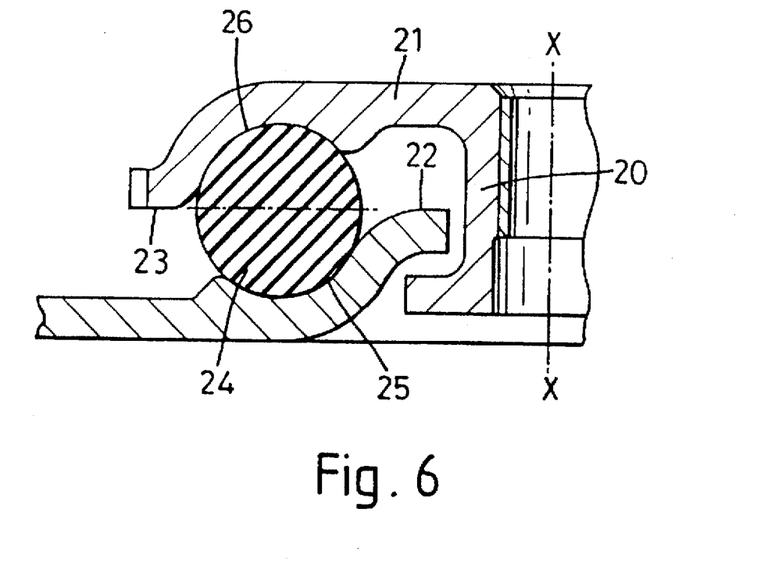
FIGS. 6 and 7 show sections of parts of two other mountings of the invention.
Figure 7:
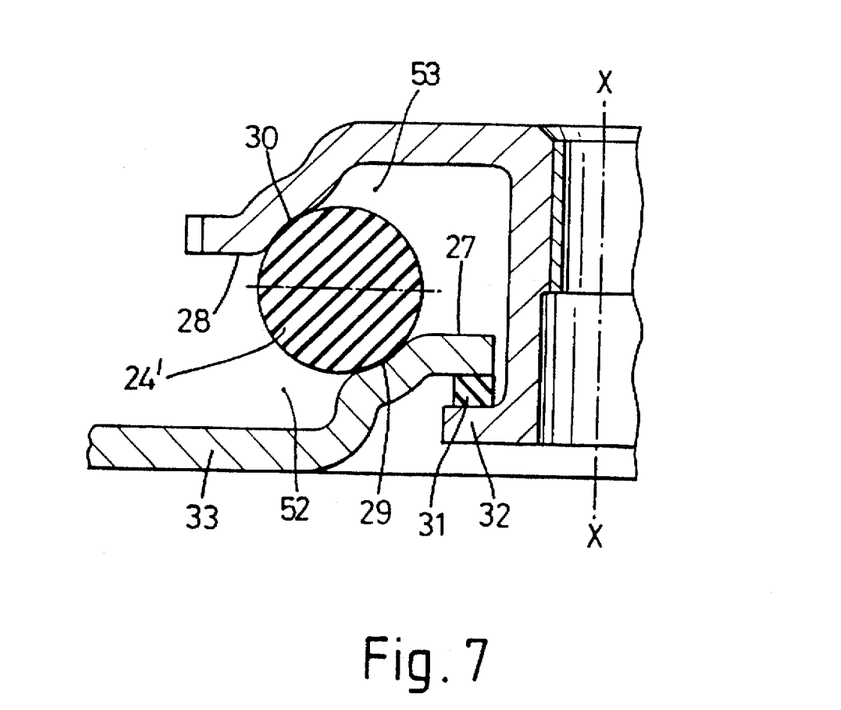
Figure 8:
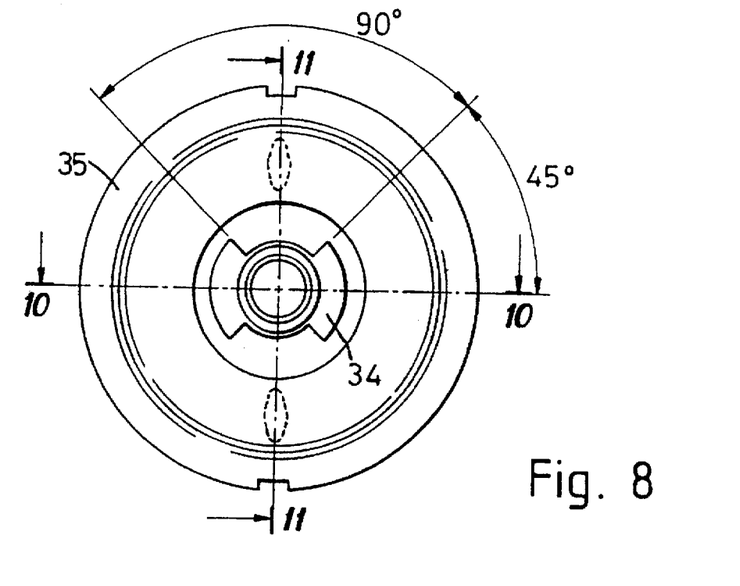
FIGS. 8 to 11 show views of part of another mounting of the invention.
Figure 9:
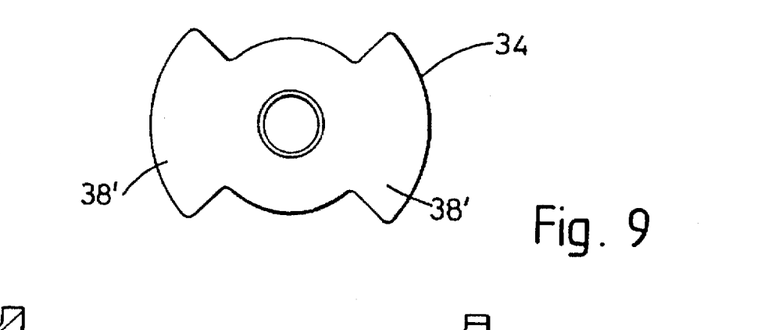
Figure 10:
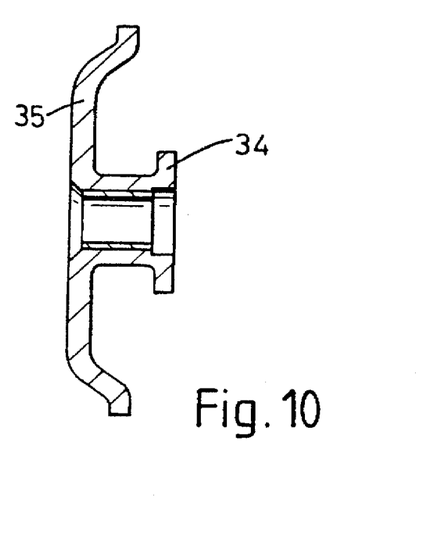
Figure 11:
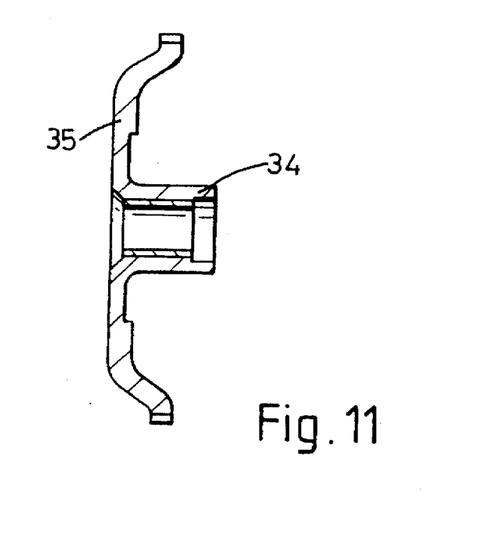

FIGS. 6 and 7 each show part of an embodiment in which the pillar 20 is integral with an upper plate 21.

In FIG. 6, in the absence of applied load, the plate boundary faces 22,23 are axially aligned in the major axis direction X—X. Each plate contacts the ring 24 more than in the FIG. 2 arrangement. In FIG. 6 each plate seat 25,26 contacts at least a quarter of the cross-sectional circumference of the ring, the contact being over approximately 135°.

In FIG. 7 the boundary faces 27,28 are spaced axially and each plate seat 29,30 contacts less than a quarter, preferably less than one fifth, of the cross sectional circumference of the ring. The FIG. 7 mounting is less stiff in the direction X—X and transversely perpendicular to X—X than the FIG. 6 mounting but it has a lower load capacity.

The confronting surfaces of the rigid members have regions which lie axially beyond the regions of the seats 29,30 which contact the ring 24' in the unloaded condition thereby to provide recess regions 52,53 which serve as flex zones to accommodate deflection of the ring in response to applied compressive loading.

FIG. 7 shows a resilient buffer 31 carried by the pillar flange 32 to cushion contact with lower plate 33 when applied compression load reduces.

Figure 12:
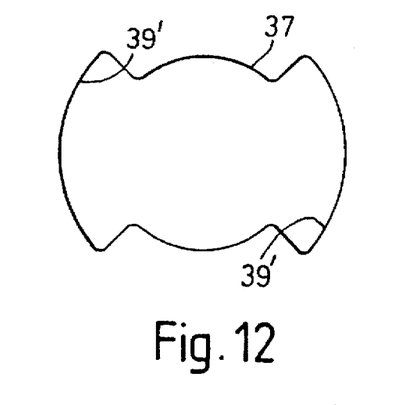
FIGS. 12 to 15 show views of another part of the mounting of FIGS. 8 to 11.
Figure 13:
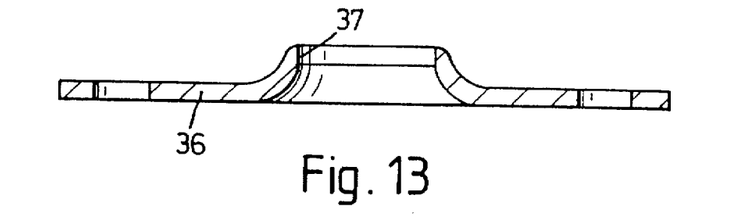
Figure 14:
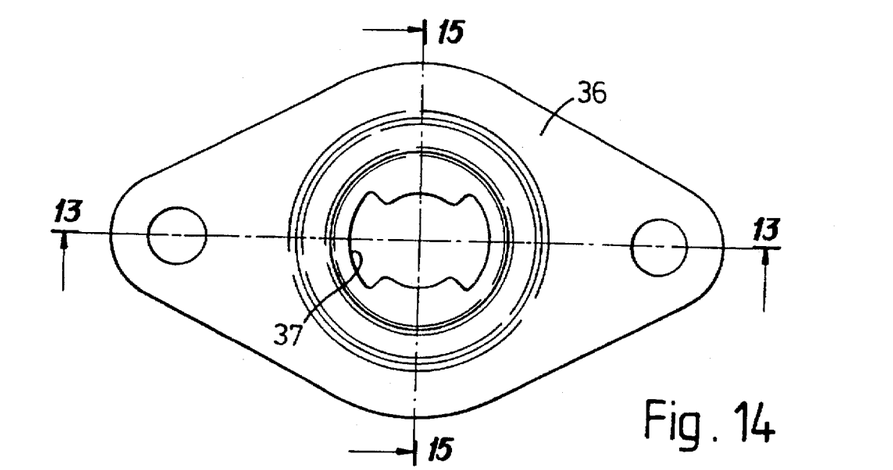
Figure 15:
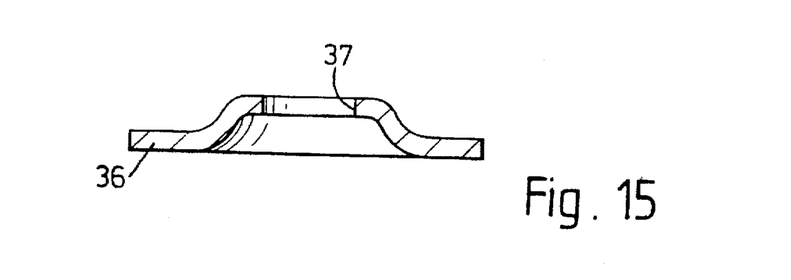

In another embodiment the upper plate and an integral pillar may have a pillar flange of irregular shape for interlocking with a lower plate. FIGS. 8 to 11 show details of an upper plate 35 with the flange profile 34 being shown overall in FIG. 9 and in part in FIGS. 10 and 11. The lower plate 36 has an aperture 37 shaped as shown in FIG. 12 to complement the flange profile 34 and allow the flange to pass through the aperture. Other details of the lower plate are evident from FIGS. 13 to 15.

Figure 16:
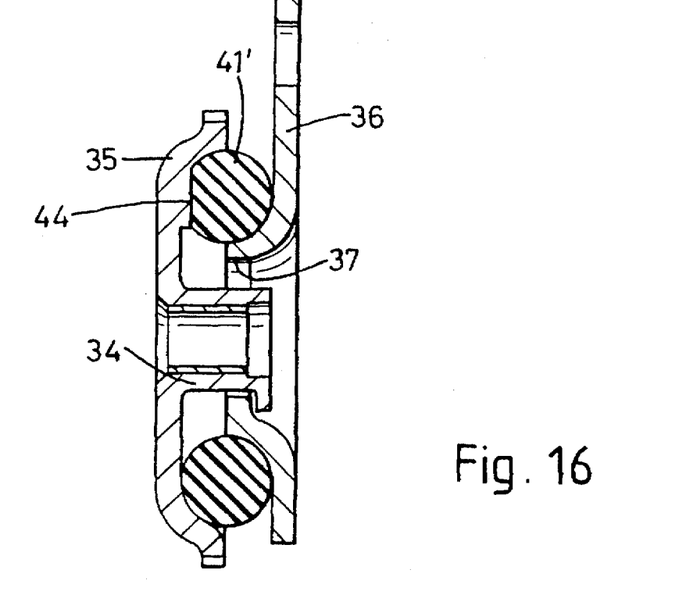
FIG. 16 shows an assembly including the parts of FIGS. 8 to 15.

The mounting is assembled by sandwiching the ring between the metal plates 35,36 (see FIG. 16) and pushing the pillar flange 34 through the aperture 37 whilst the plates are angularly positioned to align the flange profile with that of the aperture. With compression being maintained on the rubber ring the two plates are moved angularly through 90° so that the ears 38' of the flange 34 (see FIG. 9) are aligned with inward protrusions 39' of the aperture 37 (see FIG. 12) to result in an interlock as shown in the assembly view of FIG. 16.

Figure 17:
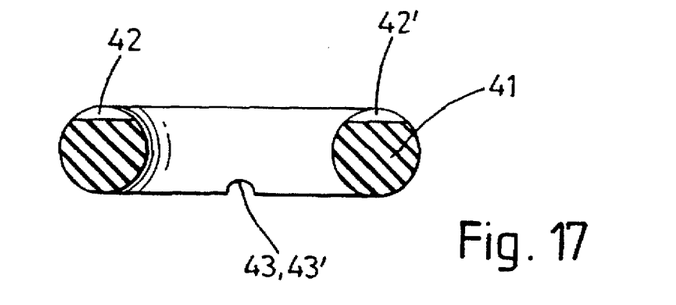
FIGS. 17 and 18 show plan and section views of the elastomeric ring of the FIG. 16 embodiment.
Figure 18:
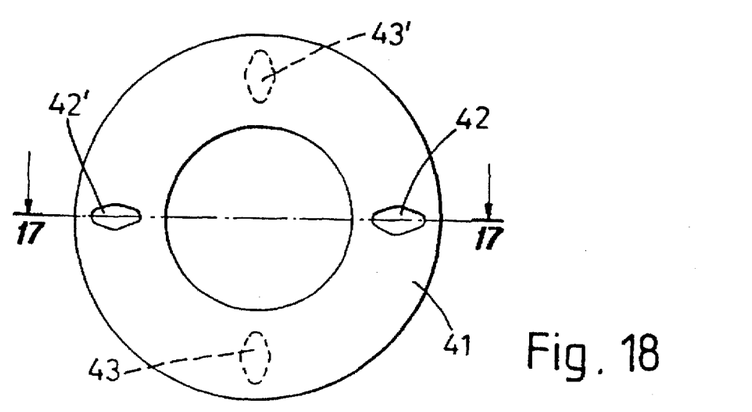

Subsequent relative rotation of the plates 35,36 to depart from the interlock orientation is prevented by moulding the ring 41 to have four indents, two 42,42' at an upper face and two 43,43' at a lower face (see FIGS. 17 and 18). The two indents at each face are diametrically opposite one another and the indents 42,42' lie at positions 90° displaced from the indents 43,43'. The indents lie in register with small projections 44 (see FIG. 16) in the upper and lower plates so as to inhibit relative angular movement of those plates.

I claim:

1. An elastomeric mounting comprising a pair of rigid members, an annular element of elastomeric material sandwiched between confronting surfaces of said members and a pillar member which extends substantially centrally through the annular element of elastomeric material into association with each of said rigid members, said pillar being secured rigidly relative to one of the rigid members and extending through an aperture in the other rigid member with an all-round clearance between the pillar and the aperture, and that end of the pillar extending through the apertured rigid member incorporating stop means engageable with the apertured rigid member to prevent unlimited free separation of the rigid members but allow the rigid members to move one towards the other to compress the elastomeric element therebetween when the mounting is subject to applied compression load, characterised in that said apertured rigid member is provided with a recess in the region of the aperture at a side of that member which faces away from the elastomeric element, said stop means is positioned in said recess; wherein the rigid members have non-planar confronting surfaces at least over parts of their respective surfaces which lie in contact with the elastomeric element and said non-planar confronting surfaces are oriented to subject the elastomeric element to compression load and rolling action when the rigid members move transversely relative to one another.

2. An elastomeric mounting in accordance with claim 1 wherein the pillar is secured rigidly relative to one of the rigid members.

3. An elastomeric mounting in accordance with claim 1 wherein the pillar is cast integrally as a part of a rigid member.

4. An elastomeric mounting in accordance with claim 1 wherein the pillar has an axial length selected to maintain the elastomeric element in compression between the rigid members at all position of relative axial spacing of the rigid members.

5. An elastomeric mounting in accordance with claim 1 wherein the apertured rigid member is formed from sheet steel pressed to a non-planar profile, one surface defining an annular surface for the elastomeric element and an opposite surface defining a recess.

6. An elastomeric mounting in accordance with claim 1 wherein said stop means is a flange which extends radially outwardly from a main body of the pillar.

7. An elastomeric mounting in accordance with claim 1 wherein said stop means or a surface of the apertured rigid member which confronts the stop means is provided with a resilient element arranged to act as a buffer therebetween.

8. An elastomeric mounting in accordance with claim 1 wherein said stop means is positioned in said recess at all states of compression of the mounting.

9. An elastomeric mounting in accordance with claim 1 wherein the rigid members are free, for assembly purposes, to move apart unrestrictedly when at a first relative angular position as considered about the major axis of the mounting and are prevented from said unlimited free separation when at a second relative angular position.

10. An elastomeric mounting in accordance with claim 1 wherein said unlimited free separation of the rigid members is prevented by an auxiliary retainer between the stop means and said other rigid member and arranged to hold the stop means from passing back through the aperture.

11. An elastomeric mounting in accordance with claim 1 wherein the region of peripheral contact between the elastomeric element and a rigid member, as considered in transverse cross-section, subtends an angle of less than 140°.

12. An elastomeric mounting in accordance with claim 1 wherein the elastomeric element is substantially free at least in part to deform radially inwards and radially outwards when compressed axially.

13. An elastomeric mounting in accordance with claim 1 wherein the elastomeric element has location formations which cooperate with complementary formations at confronting surfaces of the rigid members to prevent or restrain relative rotation of the rigid members.

14. An elastomeric mounting in accordance with claim 1 wherein the region at which one rigid member contacts the elastomeric element lies wholly spaced axially from the region at which the other rigid member contacts the elastomeric element as considered axially, in the longitudinal direction of the pillar, in the absence of applied load.

15. An elastomeric mounting in accordance with claim 1 wherein a part of the region at which one rigid member contacts the elastomeric element is axially aligned with or overlaps a part of the region at which the other rigid member contacts the elastomeric element as considered axially, in the longitudinal direction of the pillar, in the absence of applied load.

16. An elastomeric mounting in accordance with claim 1 wherein at least one of said confronting surfaces of the rigid members is of a curved shape as considered in a plane which contains the major axis of the mounting.

17. An elastomeric mounting in accordance with claim 1 wherein the elastomeric element is not bonded to either of the rigid members.

18. An elastomeric mounting in accordance with claim 1 wherein the elastomeric element is of a toroidal shape.

19. An elastomeric mounting comprising a pair of rigid members, an annular element of elastomeric material sandwiched between confronting surfaces of said members and a pillar member which extends substantially centrally through the annular element of elastomeric material into association with each of said rigid members, said pillar being secured rigidly relative to one of the rigid members and extending through an aperture in the other rigid member with an all-round clearance between the pillar and the aperture, and that end of the pillar extending through the apertured rigid member incorporating stop means engageable with the apertured rigid member to prevent unlimited free separation of the rigid members but allow the rigid members to move one towards the other to compress the elastomeric element therebetween when the mounting is subject to applied compression load, characterised in that said apertured rigid member is provided with a recess in the region of the aperture at a side of that member which faces away from the elastomeric element, said stop means is positioned in said recess; wherein the rigid members have non-planar confronting surfaces at least over parts of their respective surfaces which lie in contact with the elastomeric element and said non-planar confronting surfaces are oriented to subject the elastomeric element to compression load and rolling action when the rigid members move transversely relative to one another; wherein the pillar has an axial length selected to maintain the elastomeric element in compression.

* * * * *